United States Patent [19]
Taguchi

[11] 4,152,674
[45] May 1, 1979

[54] AIR SPACED ETALON WITH MECHANISM FOR ADJUSTING PARALLELISM OF REFLECTING SURFACES

[75] Inventor: Noboru Taguchi, Tokyo, Japan

[73] Assignee: Nippon Electric Co., Ltd., Tokyo, Japan

[21] Appl. No.: 713,499

[22] Filed: Aug. 11, 1976

[30] Foreign Application Priority Data

Aug. 21, 1975 [JP] Japan .................................. 50-115264

[51] Int. Cl.² .............................................. H01S 3/00
[52] U.S. Cl. .................................. 331/94.5 C; 356/352
[58] Field of Search ................ 356/112, 110; 350/245, 350/285, 6, 7; 331/94.5 C, 94.5 D

[56] References Cited

U.S. PATENT DOCUMENTS

| | | | |
|---|---|---|---|
| 2,137,286 | 11/1938 | Herbig | 350/285 |
| 3,771,066 | 11/1973 | Burgwald et al. | 331/94.5 D |
| 3,936,193 | 2/1976 | Auth | 356/106 S |
| 4,037,942 | 7/1977 | Guyer | 350/285 |

*Primary Examiner*—Conrad J. Clark
*Attorney, Agent, or Firm*—Ostrolenk, Faber, Gerb & Soffen

[57] ABSTRACT

An air spaced etalon for wavelength selection including a spacer comprised of two hollow cylindrical members abutting each other in end-to-end aligned relation. A high degree of parallelism of two seconds or less can be easily obtained between the opposite end surfaces of the compound spacer by adjusting the relative angular position of the spacer members irrespective of the parallelism of the end surfaces of the individual spacer members. This enables production of high performance etalons with reduced cost and high yield.

11 Claims, 6 Drawing Figures

AIR SPACED ETALON WITH MECHANISM FOR ADJUSTING PARALLELISM OF REFLECTING SURFACES

BACKGROUND OF THE INVENTION

This invention relates to optical elements for wavelength selection and more particularly to air spaced etalons having a high resolving power.

As is well known, an etalon is often used with an ion laser, for example, to achieve single frequency operation. This optical element is in effect a sort of Fabry-Perot resonator having a resonator distance l much smaller than that, L, of the laser resonator, and, for use with a laser, is accommodated in the laser resonator. Generally, in an ion laser, the Doppler-broadened gain width of the laser medium due to the Doppler effect amounts to several GigaHertz and oscillation may occur over such frequency width. Actually, however, because of the very high Q-value of the laser resonator, there exist several tens of spectrum lines with a longitudinal mode spacing determined by c/2L, where c represents the velocity of light and L represents the distance of the reflectors forming the resonator.

Such laser output makes the laser undesirable as a light source for use in holography and other similar information processing techniques utilizing light interference or in fields of spectroscopy where the scattered light dealt with is of limited frequency deviation as in Brillouin scattering. Namely, in the case of laser application to holography or the like, interference information produced by one longitudinal mode spectrum may possibly be cancelled out by another longitudinal mode spectrum and, in laser applications in the field of spectroscopy, it makes it impossible to separate frequency deviation of the Brillouin scattered light from the Rayleigh scattered light. To cope with these situations, however, it is possible to realize a single-frequency oscillation ion laser by inserting an etalon in the resonator of the ion laser oscillating at different frequencies in effect to form a sort of composite resonator. In the laser formed in this manner, oscillation takes place at only one of the several tens of spectrum lines within the Doppler width, that is, at that spectrum line which is closest to the resonance frequency of the etalon.

Use of an etalon with an ion laser has been illustrated above, but it also has many other uses. For example, in a single-frequency oscillation ruby laser, which is now employed in a variety of schemes for obtaining measurements of moving objects, an etalon is being employed for single frequency operation against the natural frequency bandwidth of the laser medium, which is said to amount to approximately 300 GHz. Further, an etalon is now indispensable as a convenient optical element usable to narrow the oscillation width of a dye laser, which is drawing attention in the field of spectroscopy.

Etalons previously in use, however, have generally taken the form of a quartz plate having a pair of opposite surfaces polished so as to be parallel to each other with a reflection coating of a reflectivity of about 20% deposited on each of the polished surfaces. As is well known, quartz is a good optical material of limited transmission loss and, due to its limited coefficient of thermal expansion, the resonance frequency of the previous form of etalon, which is determined by the thickness of the quartz plate, has only a limited temperature change of the order of $\pm 125$ MHz/° C. Recently, however, more stable etalons are being desired for use with ion lasers. Under this situation, crystalline glass materials of still lower thermal expansion coefficients such as "Neoceram-Zero" (trademark) made by Nippon Electric Glass K.K., Japan, and "Cervit" (trademark) made by B.T.R. Optics, Inc., U.S.A., are now commercially available and are being employed to form etalons which exhibit better stability under temperature change.

Actually, however, none of such crystalline glass materials can be used in the same formation as the quartz plate described hereinbefore because of the larger optical loss involved and they are therefore used to form a hollow cylindrical spacer, the opposite end surfaces of which are polished parallel to each other. Partially reflective mirrors are bonded to the respective polished end surfaces of the spacer to complete an air spaced etalon. With such form of air space etalon employing as a spacer material "Neoceram-Zero" glass, the coefficient of thermal expansion of which is substantially zero, the temperature variation of the resonance frequency has been found reduced to $\pm 17$ MHz/° C. or to about one-seventh of that of the conventional form of etalon employing a quartz plate.

Use of such a hollow cylindrical spacer, however, has previously involved some disadvantages. First, in the step of polishing the opposite end surfaces of such spacer, it can hardly be held in balance as there is no direct axial force application along the axis of the spacer because of its hollow formation as contrasted to the solid formation of quartz plates. It is very difficult, therefore, to obtain an air spaced etalon having the required parallelism of two seconds or less and this has obviously resulted in a poor yield of polishing operation and a high cost of production.

SUMMARY OF THE INVENTION

Accordingly, the present invention has for its object the provision of an improved air spaced etalon of the type including a hollow cylindrical spacer and a partially reflective mirror provided on each of the opposite end surfaces of the spacer, characterized in that the spacer is constructed and arranged such that a high degree of parallelism can easily be obtained, as desired, between the opposite end surfaces of the spacer without necessitating any high precision working of the end surfaces.

According to the present invention, the hollow cylindrical spacer provided on each of its opposite end surfaces with a partially, reflective mirror consists of two hollow cylindrical spacer members arranged to abut each other in end-to-end aligned relation.

The spacer of the air spaced etalon of the present invention can have its opposite end surfaces made exactly parallel to each other with particular ease owing to its unique compound structure, consisting of two members of equal or nearly equal axial length closely abutting each other in end-to-end aligned relation. In other words, the compound form spacer can obtain a parallelism of two seconds or less between the opposite end surfaces thereof simply by adjusting the abutting spacer members angularly relative to each other about the spacer axis even if the individual members have their opposite end surfaces finished such that they are not exactly parallel to each other.

The above and other objects, features and advantages of the present invention will become apparent from the following description when taken in conjunction with the accompanying drawing.

DETAILED DESCRIPTION OF THE PREFERRED EMBODIMENT

Figure 1:
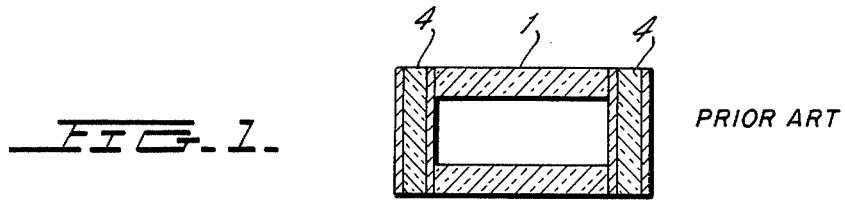
FIG. 1 is an axial cross-sectional view of a typical form of conventional hollow-cylindrical type air spaced etalon.

Referring first to FIG. 1, which illustrates a conventional form of air spaced etalon, reference numeral 1 indicates a hollow cylindrical spacer of an integral formation and 4 indicates two partially reflective mirrors arranged in contact with the respective end surfaces of the spacer 1. As stated hereinabove, with such conventional form of air spaced etalon, it is very difficult to finish the opposite end surfaces of the spacer 1 to such high degree of parallelism as of two seconds or less.

Description will next be made of the principle of the present invention with reference to the diagrams of FIGS. 2A, 2B and 2C.

Figure 2A:
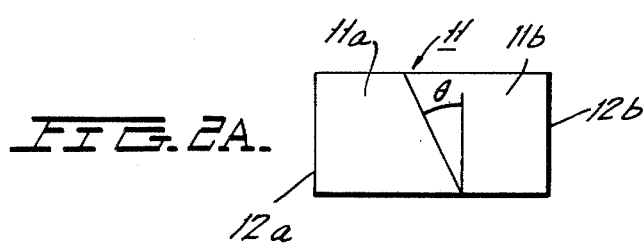
FIGS. 2A, 2B and 2C are diagrams illustrating the principle of the present invention.
Figure 2B:
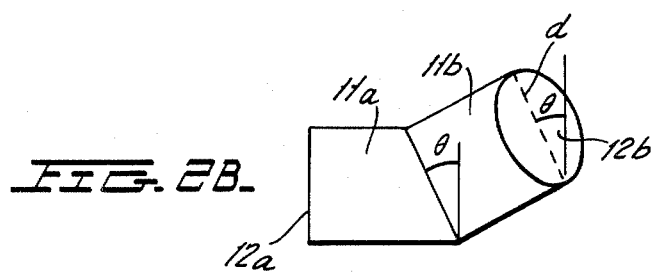
Figure 2C:
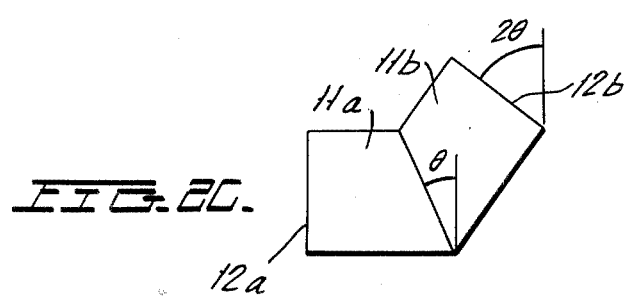

In FIG. 2A, reference numeral 11 indicates a right circular cylinder having opposite end surfaces 12 and 12b, which are exactly parallel to each other. Suppose that the circular cylinder 11 is cut lengthwise into two equal segements 11a and 11b along a plane vertical to the plane of the figure and forming substantially planar surfaces which are inclined to the end surfaces 12a and 12b at an angle of $\theta$. One of the two segments, 11b, is then rotated about it axis relative to the other segment 11a, which is held fixed, through an angle of 90° about the axis of the latter, as to the position shown in FIG. 2B. In this position, the minor axis of the ellipse defined by the cut end surface of segment 11b coincides with the major axis of the ellipse of the adjacent end surface of segment 11a and a diametric line d on the end surface 12b, which is parallel to the minor axis, is inclined to the opposite end surface 12a at an angle of $\theta$. Next, when the segment 11b is turned further through 90°, the end surface 12b is placed in a position inclined at an angle of $2\theta$ to the opposite end surface 12a, as illustrated in FIG. 2C. It will be apparent, therefore, that the angle of inclination of one end surface 12a relative to the other end surface 12b varies from zero to $2\theta$ as one of the two segments 11a and 11b is turned relative to the other segment through an angle of 180°. In conclusion, the opposite end surfaces of the sectionalized circular cylinder can be placed in parallel or inclined to each other, as desired, by relative turning movement of the cylinder segments about a longitudinal axis. It will be apparent that the relative inclination of the end surfaces is variable in direction as well as in degree.

Now assume that the abutting end surface of one of the cylinder segments, 11a, is inclined at an angle $\theta_1$, to a plane normal to the central axis of the cylinder segment 11a while that of the other cylinder segment 11b is inclined at an angle of $\theta_2$ to a plane normal to the axis of segment 11b. The opposite end surfaces 12a and 12b of the respective cylinder segements 11a and 11b are each supposed to be normal to the axis of the associated cylinder segment 11a or 11b. Then, the degree of parallelism of the opposite end surfaces 12a and 12b of the respective segments 11a and 11b as held in abutting engagement with each other varies with relative turning movement of the segments within a range of from $(\theta_1-\theta_2)$ to $(\theta_1+\theta_2)$. This means that the degree of parallelism can be adjusted to an accuracy of $\{(\theta_1+\theta_2)-(|\theta_1-\theta_2|)\}/180$ per degree of relative angular rotation.

In accordance with the principle described above, the air spaced etalon of the present invention includes a hollow cylindrical spacer which is composed of two spacer members abutting each other in end-to-end aligned relation and the opposite end surfaces of which can be aligned to have a high degree of parallelism desired therebetween even if the individual spacer members lack a corresponding high degree of parallelism between their opposite end surfaces as the spacer members are angularly adjustable relative to each other so that their inaccuracies cancel out each other.

Figure 3:
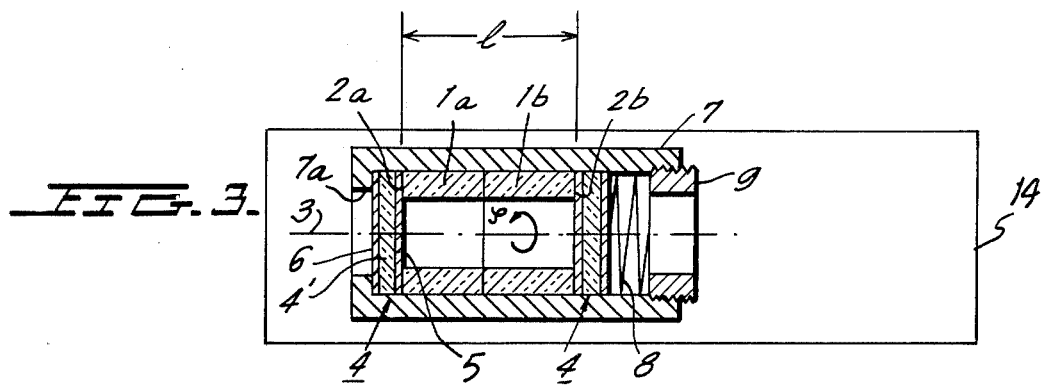
FIG. 3 is a view similar to FIG. 1, illustrating a preferred embodiment of the present invention.

The present invention will next be described in further detail with reference to FIG. 3, which illustrates a preferred embodiment of the invention. As shown in FIG. 3, the air spaced etalon is located in a laser resonator 14 having a first resonated distance and capable of generating a laser beam containing several frequencies of radiation. The air spaced etalon is inserted in the laser resonator and has a second resonator distance, smaller than the first resonator distance.

In FIG. 3, reference numerals 1a and 1b indicate respective hollow cylindrical spacer members formed of "Neoceram-Zero" glass material and each having an axial length corresponding to half the desired mirror distances l of the etalon. Each of the spacer members may have its opposite end surfaces finished not necessarily fully parallel to each other. As shown, the two spacer members are disposed in closely abutting relation to each other along the etalon axis 3 to form a compound spacer.

Provided on each of the opposite end surfaces 2a and 2b of the compound spacer 1a–1b is a partially reflective mirror 4 which is comprised of a substrate 4' formed of an optical glass material with a reflection coating 5 deposited on the substrate surface adjacent to the neighboring spacer member 1a or 1b and an antireflection or reflection-reducing coating 6 vapor-deposited on the opposite surface of substrate 4' for attenuting light impinging thereon. The opposite end surfaces of the mirrors 4 are preferably substantially parallel. Reference numeral 7 indicates a generally cylindrical casing frame which is formed at one end with a supporting projection or annular flange 7a extending radially inward, as shown, and in which the spacer members 1a and 1b and partially reflective mirrors 4 are fittingly inserted through the opposite open end of the casing in the order of one of the partially reflective mirrors 4, spacer members 1a and 1b, and the remaining partially reflective mirror 4. Reference numeral 8 indicates a coiled (preferably) helical) compression spring arranged in the casing 7 axially outside of the etalon components 1a, 1b and 4 thus received therein, that is, outside of the second-mentioned partially reflective mirror, and 9 indicates a threaded annular clamping member adjustably fitted in this end of the casing having a cooperating tapped interior portion. The coiled spring 8 is compressed between the adjacent mirror 4 and the annular clamp 9 as the latter is threaded into the casing end and, in this manner, the etalon components 1a, 1b and 4 are held firmly against each other and, as a whole, against the annular supporting flange of casing in an assembled state. The relative angular position of the spacer members 1a and 1b thus assembled along the axis 3 can be made readily adjustable in relative angular position, as desired, simply by screwing back the annular clamp 9. The annular adjustment of the spacer members about the axis 3 can also be effected with ease while they are held in close abutting engagement with each other by employing suitable adjusting means, for example, including an appropriate jig and a turning mechanism therefor.

Figure 4:
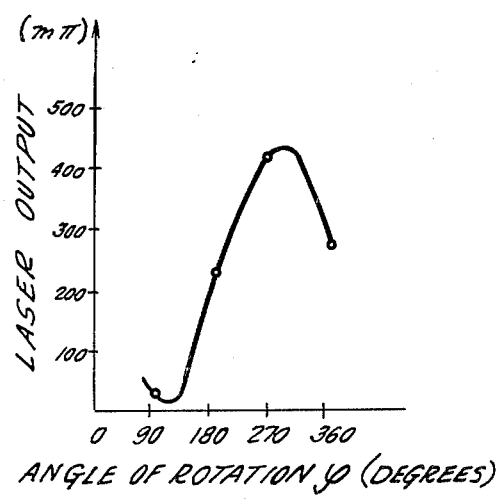
FIG. 4 is a graphic illustration of the relation between the angle of relative rotation of the spacer members and the laser output, as obtained with the air spaced etalon of the present invention inserted in an Ar+laser resonator.

The diagram of FIG. 4 graphically illustrates the effect of the angular adjustment of the spacer members. In the diagram, the abscissa represents the angle of relative rotation $\phi$, in degrees, of the spacer members 1a and 1b as measured from an arbitrarily selected 0° position and the ordinate represents the single-frequency output, in milliwatts, of a 700-mW Ar+ laser obtained for a spectrum line of oscillation of 5145 Å with the described air spaced etalon inserted in the laser resonator. As observed in the diagram, a maximum output has been obtained at an angle of relative rotation of approximately 280°, indicating that the etalon obtained with the spacer members adjusted to such relative angular position is practically perfect, exhibiting substantially the precise degree of parallelism desired.

As was described hereinbefore, in the case of conventional spacers of an integral formation, it has been very difficult to finish the opposite end surfaces to a desired degree of parallelism of two seconds or less, and there has been no warrant of performance with the products obtained. In contrast, the air spaced etalon of the present invention, including a two-part compound spacer, can have a practically perfect performance with its spacer members angularly adjusted relative to each other. In addition, with the use of a spacer material having an extremely low coefficient of thermal expansion, the air spaced etalon is highly stable against temperature change, taking full advantage of the thermal characteristic of the spacer material, is easily obtainable.

It will be readily appreciated that, according to the present invention, a highly stable air spaced etalon advantageously usable with an ion or dye laser is obtainable in a simplified manner and at a reduced cost of production.

What is claimed is:

1. An air spaced etalon, comprising:
   a first hollow cylindrical spacer having first and second end faces, said second end face lying in a plane which is substantially, but not exactly, perpendicular to the central axis of said first spacer;
   a second hollow cylindrical spacer having first and second end faces, said second end face lying in a plane which is substantially, but not exactly, perpendicular to the central axis of said second spacer;
   a first partially transmissive mirror located adjacent said first end face of said first spacer and adapted to permit light originating from without said first spacer and impinging on said first mirror to enter said first spacer, said first mirror also adapted to permit light originating from within said first spacer and impinging on said first mirror to be reflected back into said first spacer;
   a second partially transmissive mirror located adjacent said first end face of said second spacer and adapted to permit light which originates from within said second spacer and impinges on said second mirror to be partially reflected back into said second spacer and to be partially transmitted through said second mirror outside of said second spacer;
   means for aligning said spacers along a common axis with said second end face of said first spacer being adjacent said second end face of said second spacer whereby a light beam having a particular wave length and an output power determined by the relative angle of rotation of said first and second spacers is derived from said second mirror.

2. An air spaced etalon as claimed in claim 1, wherein said first and second spacers are formed of a crystalline glass material having a reduced coefficient of thermal expansion.

3. An air spaced etalon as claimed in claim 2, wherein said first end faces of each of said spacers is substantially perpendicular to the central axis of its respective spacer.

4. An air spaced etalon as claimed in claim 1 wherein each of said mirrors have opposite end surfaces, one end surface of each of said mirrors located adjacent said first end face of its respective spacer.

5. An air spaced etalon as claimed in claim 4 wherein a coating of a reflectivity of the order of 20% for a predetermined wave length is coated on said one of said end faces of each of said mirrors and an anti-reflective coating is coated on the other end surface of each of said mirrors.

6. An air spaced etalon as claimed in claim 5, wherein the substrate of each of said mirrors is quartz.

7. An air spaced etalon as claimed in claim 1 further including housing means for retaining said spacers and said mirrors in an assembled state.

8. An air spaced etalon as claimed in claim 7, wherein said housing means includes a cylindrical shaped casing having a radially inward extending support projection at one end and a removable annular clamp cooperating with a cylindrical opening at an opposite end of said casing and wherein said first mirror, said first spacer, said second spacer, and said second mirror are sequentially disposed within said housing, said first mirror lying adjacent said inwardly extending supporting projection, said second mirror located adjacent a compression spring located between said second mirror and said annular clamp.

9. The air spaced etalon of claim 1 wherein each of said first and second mirrors comprise a cylindrical substrate of an optical material of limited transmission loss, each of said mirrors having first and second substantially parallel end surfaces, one end surface of each of said mirrors located adjacent said first end face of its respective spacer, said one end surface of each said mirror having a reflective coating of a predetermined reflectivity.

10. The etalon of claim 9, wherein said second end surface of each of said mirrors is provided with a coating of a material having a predetermined reflection attenuating characteristic.

11. An optical apparatus comprising a laser resonator having a first resonator distance and capable of generating a laser beam containing several frequencies of radiation, said laser resonator including a laser medium and an air spaced etalon inserted in said laser resonator, said etalon having a second resonator distance, smaller than said first resonator distance and comprising:
   a first hollow cylindrical spacer having first and second end faces, said second end face lying in a plane which is substantially but not exactly perpendicular to the central axis of said first spacer;

a second hollow cylindrical spacer having first and second end faces, said second end face lying in a plane which is substantially but not exactly perpendicular to the central axis of said second spacer;

a first partially transmissive mirror located adjacent said first end face of said first spacer and adapted to permit light originating from without said first spacer and impinging on said first mirror to enter said first spacer, said first mirror also adapted to permit light originating from within said first spacer and impinging on said first mirror to be reflected back into said first spacer;

a second partially transmissive mirror located adjacent said fist end face of said second spacer and adapted to permit light which originates from within said second spacer and impinges on said second mirror to be partially reflected back into said second spacer and to be partially transmitted through said second mirror outside of said second spacer;

means for aligning said spacers along a common axis with said second end face of said first spacer being adjacent said second end face of said second spacer whereby said laser beam generated by said laser resonator passes through said first mirror into said first and second spacers, is reflected between said first and second mirrors within said first and second spacers and passes without said second mirror as a single frequency laser beam having a wave length and an output power determined by the relative angle of rotation of said first and second spacers.

* * * * *